H. F. JONES.
GAGE.
APPLICATION FILED MAY 15, 1919. RENEWED MAR. 18, 1920.

1,358,374. Patented Nov. 9, 1920.

Inventor
H. F. Jones
Johnson and Johnson
By Attorneys

UNITED STATES PATENT OFFICE.

HOWARD F. JONES, OF WARRENTON, NORTH CAROLINA.

GAGE.

1,358,374. Specification of Letters Patent. Patented Nov. 9, 1920.

Application filed May 15, 1919, Serial No. 297,417. Renewed March 18, 1920. Serial No. 366,964.

*To all whom it may concern:*

Be it known that I, HOWARD F. JONES, a citizen of the United States, residing at Warrenton, in the county of Warren and State of North Carolina, have invented certain new and useful Improvements in Gages, of which the following is a specification.

This invention relates to gages and more particularly to improvements in that type of gage shown in my prior United States Patent No. 1,275,935, dated August 13, 1918. The above patent shows a gage particularly adapted to indicate the amount of fluid in a tank and after measuring such fluid to discharge the contents of the gage.

One of the objects of the present invention is to provide a simple and practical gage for indicating the height of liquid in a tank.

A further object is to provide a gage of the above character having relatively few parts which may be inexpensively manufactured and assembled.

A further object is to provide a gage of the first above mentioned character particularly adapted for use with the oil tanks of automobiles although it is to be understood that it is applicable to other uses as well. For convenience, however, the invention will be hereinafter described with relation to the application of an improved gage to the oil tank of an automobile.

Other objects will be in part obvious and in part hereinafter pointed out.

In order that a clear perception of the present invention may be had, a drawing illustrating one of the various possible embodiments of the invention is herewith attached and in the several views of which like reference characters denote corresponding parts.

In this drawing Figure 1 illustrates perspectively the entire invention as applied to the gage of an oil tank.

Figure 1:
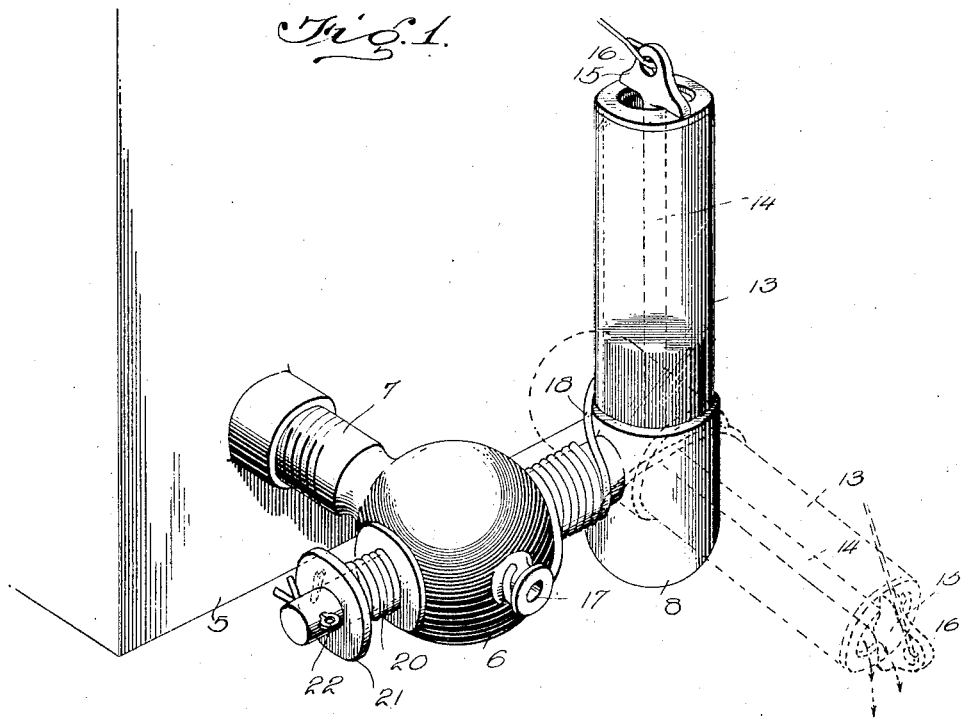
Figure 2:
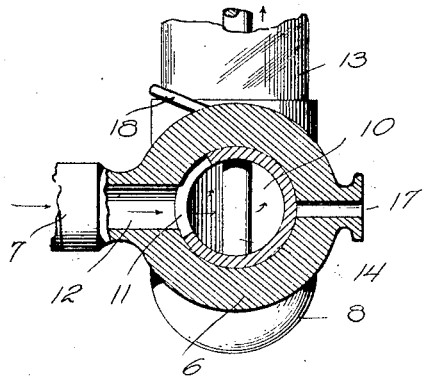
Fig. 2 is a detail view in measuring position.
Figure 3:
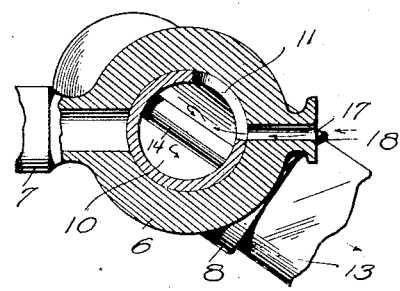
Fig. 3 is a detail view in draining position.

Referring now to the drawing in detail and more particularly to Fig. 1, 5 denotes a tank or other suitable receptacle adapted to contain a fluid, the quantity of which is sought to be measured by the gage. This tank is provided with a suitable opening in which a member 6 is adapted to be inserted as by means of the screw thread 7. The member 6 has a central transverse bore through which a valve member 8 is adapted to pass. This valve member 8 is provided with a through opening 10 having a lateral opening or passage 11 communicating with a passage 12 in the member 6. The part 8 carries a glass gage 13 held in place by means of a screw or other device 14 extending down centrally through the glass tube 13 to the member 8. This screw is provided with a flat head 15 provided with an opening 16 to which a string or chain is adapted to be connected. The purpose of this flat-headed screw is to provide an opening in the top of the glass tube 13 whereby when the tube is swung downwardly into the dotted line position the contents of the gage will be permitted to drain therefrom. The member 6 is also provided with an air inlet 17 which allows air to enter through the passages 11 and 10 to the interior of the tube 13 when swung to the dotted line position. A spring 18 connects the parts 6 and 8 in such a manner as to normally urge the tube 13 into the dotted line position thereby automatically shutting off the passage 12 and allowing air to enter through the port 17 to permit a proper draining of the gage.

The operation of the present device is substantially as follows:—

Normally the parts are in the dotted line position, Fig. 1, and when it is desired to measure the amount of liquid within the tank 5, the tube 13 is pulled upwardly to the position shown as by means of the string or wire attached through the eyelet 16. This allows the liquid to flow from the tank 5 in through the passages 12, 11 and 10 and upwardly into the glass tube 13 thereby to show clearly the amount of fluid within the tank. On releasing the cord or other operating means the spring 18 will automatically return the gage to the dotted line position thus shutting off the passage communicating with the tank and opening the port 17. The fluid within the gage will drip or drain from the tube 13 through the open end and be aided by reason of the air inlet port 17, which, when the gage is in dotted position communicates with the lateral port 11.

It is thus seen that the present invention provides a simple and practical gage having relatively few parts which may be inexpensively manufactured and assembled for automobile oil tanks and the automatic feature of operation prevents a material leakage of oil. Should the gage be accidentally hit while working on the machine or by some obstruction be moved to open position, the spring 18 will automatically shut off the flow and allow the gage to drain its contents thus being in a clear dry condition for subsequent measuring.

It will be noted that the members 6 and 8 are held in relatively tight position by means of the spring 20 acting between the member 6 and a washer 21 secured to the valve stem by means of pin 22. This construction prevents leakage of oil as wear of the parts may occur after long usage.

What I claim is:—

1. In a gage of the character described, in combination, a member having a passage adapted to communicate with the interior of a receptacle, a tubular valve stem communicating with said passage and a gage associated with said valve stem, the interior of which is adapted to communicate through said passages with the interior of said receptacle, said gage indicating the height of liquid in said receptacle when said valve member occupies a predetermined position and means for automatically turning said valve member to normal position to drain the contents of the gage and place the valve member in closed position.

2. In a gage of the character described, in combination, a member having a passage adapted to communicate with the interior of a receptacle, a tubular valve stem communicating with said passage and a gage associated with said valve stem, the interior of which is adapted to communicate through said passage with the interior of said receptacle, said gage indicating the height of liquid in said receptacle when said valve member occupies a predetermined position and means for automatically turning said valve member to normal position to drain the contents of the gage and place the valve member in closed position, said means comprising a spring acting between said first mentioned member and the gage.

3. In a gage of the character described, in combination, a member having a passage adapted to communicate with the interior of a receptacle, a valve associated with said member and a gage associated with said valve the gage indicating the level of the liquid in said receptacle when said parts are moved to a predetermined position and means for automatically moving said valve to an inclined position after measuring to drain the gage and place the valve in closed position.

In testimony whereof I affix my signature in the presence of two witnesses.

HOWARD F. JONES.

Witnesses:
 R. A. BLAIR,
 K. E. KLEIN.